R. H. BUTTERS.
METHOD OF FORMING OR RENEWING GIN OR LINTER SAW TEETH.
APPLICATION FILED NOV. 28, 1916.

1,277,375.

Patented Sept. 3, 1918.
2 SHEETS—SHEET 1.

Witnesses:
John Powers
C. J. Kesler

Inventor:
Robert H. Butters
by James L. Norris,
Attorney

R. H. BUTTERS.
METHOD OF FORMING OR RENEWING GIN OR LINTER SAW TEETH.
APPLICATION FILED NOV. 28, 1916.
1,277,375.
Patented Sept. 3, 1918.
2 SHEETS—SHEET 2.
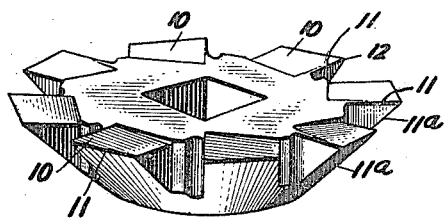
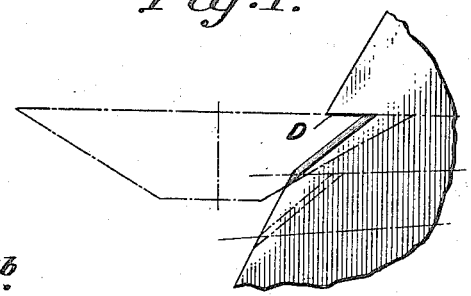
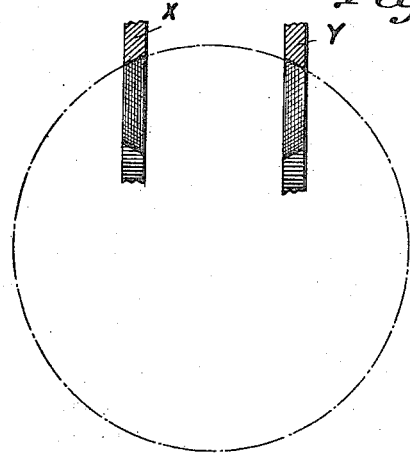
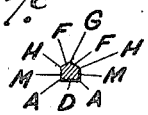
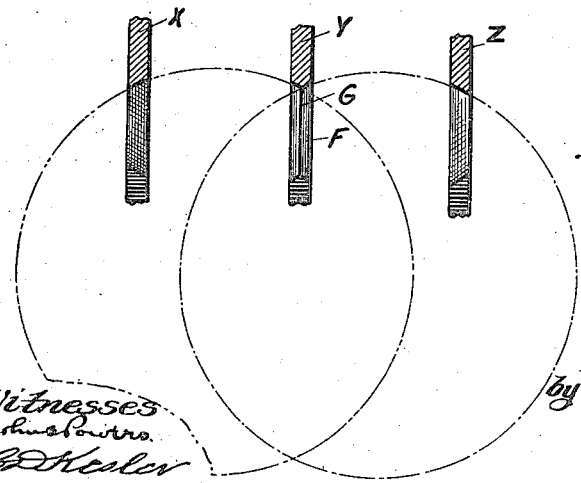
Inventor:
Robert H. Butters
by
James L. Norris,
Attorney

UNITED STATES PATENT OFFICE.

ROBERT H. BUTTERS, OF ATLANTA, GEORGIA, ASSIGNOR TO THE BUTTERS-CAMP MFG. CO., A CORPORATION OF GEORGIA.

METHOD OF FORMING OR RENEWING GIN OR LINTER SAW TEETH.

1,277,375.     Specification of Letters Patent.     Patented Sept. 3, 1918.

Application filed November 28, 1916. Serial No. 133,923.

*To all whom it may concern:*

Be it known that I, ROBERT H. BUTTERS, a citizen of the United States, residing at Atlanta, in the county of Fulton and State of Georgia, have invented new and useful Improvements in Methods of Forming or Renewing Gin or Linter Saw Teeth, of which the following is a specification.

This invention relates to a method of forming gin or linter saw-teeth. The improved method is applicable alike to the formation of teeth in saw blanks, to the formation of teeth of novel structural character in formed saws of the existing types, and to the renewal of such teeth after a period of use. By the present method the teeth are not only given the requisite form or outline, but they are also uniformly and efficiently sharpened and pointed; hence, the method in practical effect, achieves the purposes of the saw filing and gumming devices ordinarily employed, although with incomparably superior results as regards the character or structure, and condition, of the teeth.

The objects of the invention will doubtless be more readily appreciated if, as a preliminary, attention be called to certain conditions at present existing in the art.

While the invention is applicable alike to the teeth of both gin and linter saws, its need and value will be most pronounced in the case of linter saws. The linters work on the cotton seed from which the long fiber cotton has been previously removed by the gins, and the purpose of the linters is to remove from such seed, as effectively as possible, the relatively short cotton fibers still adhering thereto. For the efficient accomplishment of this purpose, it is necessary that the linter saws should be kept sharp and in as good condition as possible; and it is, therefore, the practice in the art to sharpen the linter saws at frequent intervals, a daily sharpening thereof being resorted to in many of the mills. For such work, as also for the original sharpening of the teeth as punched from the blanks in accordance with the existing method of forming the teeth, it has been the universal custom for many years past to use saw filing and gumming machines of a conventional type. In these machines the action of the files and of the gummer is dependent, for its good or bad effects, on the condition of the teeth, and on their alinement transversely of the gang. In the operation of the linters, the saws are revolved at a speed of 400 R. P. M., and the teeth are subject to unusual wear and tear; accordingly, it invariably happens that some of the teeth will become distorted in the course of use, as by having their points twisted laterally, or bent up or back, or blunted or flattened. Such deformation of the teeth destroys their uniformity and impairs their alinement transversely of the gang; and is not corrected, but, on the contrary, is, in most cases, aggravated by the ordinary filing or gumming machine, and it follows that teeth which have once become deformed in the use of the saws rapidly go from bad to worse in connection with repeated sharpenings of the saws by the filing and gumming devices ordinarily employed. The results are that after one or more operations of the ordinary filing and gumming machine, the teeth lose all semblance of uniformity in proportion, form and condition, and the useful life of the saws, which are comparatively expensive and must be made from a special grade of steel, is greatly impaired. Under existing conditions, the saws are used for a period of a few months, rarely more than four months and usually from two to three months, and upon the completion of such a period, they are practically useless and must, therefore, be "scrapped."

In the operation of the linters, the best results are obtained in accordance with the sharpness and aggregate length of the cutting edges of the teeth. This aggregate length of the cutting edges will be greater or less, accordingly as the number of teeth on a saw may be greater or less. It is important, therefore, that the saws should have as great a number of teeth as possible, consistent with strength. In most instances, the saws, having an original diameter of about twelve and one-half inches, are provided with two hundred and eighty teeth, although, in some cases, the number may be increased. It may be stated, however, that it has not been regarded as practical to provide linter saws with substantially more than three hundred teeth. As regards their form, teeth of the types heretofore existing have a rectangular cross-section in any transverse plane throughout their length and regularly taper from base to point. Such strength as the ordinary teeth may have, is, by virtue of their form as described, dependent upon their not being cut beyond a prescribed length; and, therefore, the maximum length of the teeth, as also the maximum number of teeth with which a saw may be provided, and, hence, the aggregate length of the cutting edges of the teeth, are limited by their form, but, however efficient the teeth may be when the saws are new, as regards their length, regularity and uniformity of outline, and the aggregate length of their cutting edges, they rapidly lose their original efficiency in daily use for the reasons already stated.

One object of the invention is to provide a method which shall be especially adapted to the formation of gin or linter saw teeth of novel and advantageous character, viz., which shall have much greater strength and a greater amount of stock than the teeth ordinarily employed, which, in general, shall be better adapted to the ginning or linting operation than teeth of the ordinary form and of which a greater number may be provided than is possible under conditions heretofore existing.

A further object of the invention is to provide a method of forming or renewing gin or linter saw teeth whereby the teeth are positively shaped or formed; whereby formed saws of the types heretofore existing may be provided with teeth of the advantageous character referred to; and whereby the teeth may be maintained in perfect and uniform alinement transversely of the gang.

A further object of the invention is to provide a method of forming or renewing linter saw teeth whereby the teeth, having the above stated advantages, shall also have longer cutting edges than the teeth ordinarily employed and are sharpened by the same means and in the same operation which are employed for their shaping or formation; and whereby in renewal, the teeth may be brought to the same condition as new teeth and may have their original outlines effectually and uniformly maintained and their original degree of sharpness uniformly restored.

By the attainment of the above objects, there are served the ultimate purposes of enabling the useful life of the saws to be indefinitely extended, of enabling the saws to operate with greater efficiency than saws of the ordinary type and with substantially the same efficiency throughout their entire life as when new, of reducing the time required for renewing or sharpening the saws, thereby effecting an economy in the number of saws required and in the maintenance of the saws, and, in the case of linter saws, of providing a greater aggregate length of cutting edges and of increasing the efficiency of such cutting edges, thereby providing for a greatly increased recovery of lint with minimum damage to the seed when the lint is cut.

With the above objects in view the invention consists in the method of forming or renewing gin or linter saw teeth, and, in the case of linter saw teeth, of sharpening them in connection with their formation or renewal, by a cutter operating first at one, and thereafter at the opposite side of the saw.

The accompanying drawings illustrate the practice method and the novel and advantageous form of tooth thereby produced. The saws and the teeth selected for the purposes of illustration are adapted for linter gins and are greatly exaggerated to promote clearness of illustration.

In the said drawings—

Figure 1 is a diagrammatic front or edge elevation showing the cutter as working simultaneously upon two saws at relatively opposite sides thereof;

Fig. 1$^a$ is a side elevation projected in the plane 1$^a$—1$^a$ of Fig. 1;

Fig. 1$^b$ is a sectional plan view projected in the plane 1$^b$—1$^b$ of Fig 1;

Figure 1:
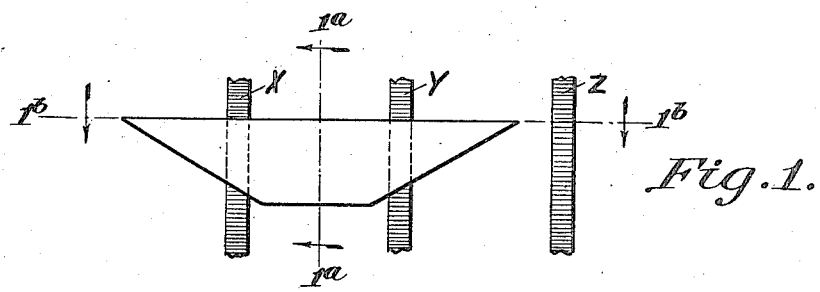
Figure 2:
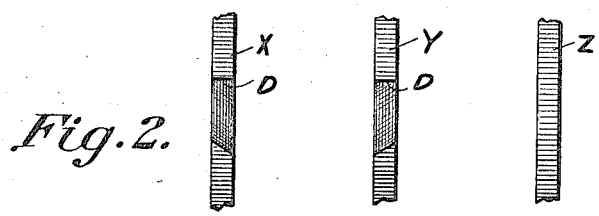
Fig. 2 is a view similar to Fig. 1 but with the cutter omitted and showing more particularly the condition of the saws upon the completion of the first or initial cut.
Figure 3:
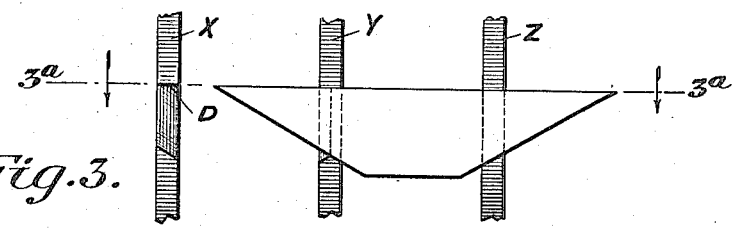
Fig. 3 is a view similar to Fig. 1 but showing the cutter as making the second or final cut on one of the saws.
Figure 4:
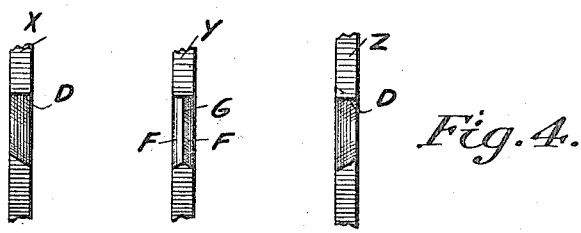
Figure 5:
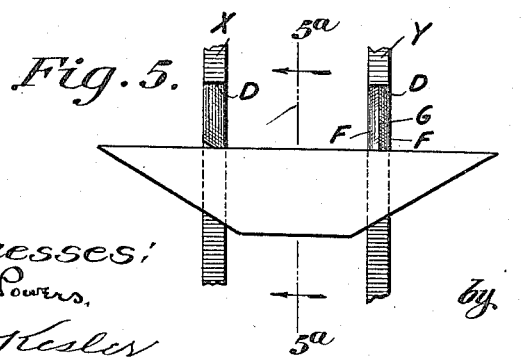

Fig. 3$^a$ is a sectional plan view projected in the plane 3$^a$—3$^a$ of Fig. 3;

Fig. 4 is a view showing the saws upon the completion of the operation depicted in Figs. 3 and 3$^a$;

Fig. 5 is a view similar to Fig. 1 but showing the cutter working on the teeth next below those shown in Fig. 2;

Fig. 5$^a$ is a side elevation projected in the plane 5$^a$—5$^a$ of Fig. 5;

Fig. 6 is a detail perspective view of the cutter;

Fig. 7 is a fragmentary side elevation of a saw showing the completely formed teeth;

Fig. 7$^a$ is a bottom sectional plan view projected in the plane 7$^a$—7$^b$ of Fig. 7;

Fig. 7$^b$ is a normal plan view projected in the plane 7$^a$—7$^b$ of Fig. 7; and Fig. 7$^c$ is a cross-sectional view of one of the teeth in the plane 7$^c$—7$^c$ of Fig. 7.

Similar characters of reference designate corresponding parts throughout the several views.

The novel and advantageous form of tooth for whose production the method is specially adapted, forms the subject of my co-pending application, Serial No. 152,894, but is disclosed herein and will be briefly and preliminarily described in order that the practice and advantages of the invention may more clearly appear.

The finished teeth (Figs. 7, 7ª, 7ᵇ and 7ᶜ) have cutting edges A which adapt said teeth for linter gins and are preferably parallel as far as points B, and from said points B taper to a terminal point C. The edges A and the points B and C are in the plane of the base D of the tooth; and the base D of one tooth meets the upper face of the tooth next below, forming therewith an angular throat E. The upper face of each tooth has sides F inclined divergingly and symmetrically from a central apex G. Inwardly of the inclined faces F the teeth have the same thickness as the saw and their sides M are co-planar with the sides of the saw. The side edges H of the inclined faces F extend parallel to the apex G and from the points B to points I in the rear of the point K whereat the apex G meets the base D of the tooth next above and between which and the terminal point C the apex G extends. The points I and K may be regarded as the angles of an imaginary triangle co-planar with the base D, two sides L of which triangle connect the point K with the points I. The point K, sides L and points I constitute the angular base line of the throat E which thus has a convex V form. In practice, the distance between the terminal point of the tooth and the point K is about the same as the distance between the terminal point of an ordinary tooth and its transversely straight throat. The edges A have their inner terminals at the points I and, therefore, extend for a substantial distance inwardly beyond the point K; and said edges A are longer than the cutting edges of an ordinary tooth by the distance through which they extend inwardly beyond the point K. This lengthening of the cutting edges A is, however, without any effect in weakening the tooth at the throat owing to the facts that the tooth throughout the greater portion of its extent has the same thickness as the saw, and, hence, has an augmented amount of stock, and that the integral stock within the imaginary triangle I—K—I constitutes a reinforcement for the throat while providing for the inward extension of the edges A beyond the transverse line in which the point K is located. Stated more briefly, and less analytically, the base of each tooth is under cut at the throat to provide for inward extensions of the cutting edges and for an integral reinforcement projecting outward beyond the inner terminals of the cutting edges.

Fig. 7ª shows, in plan, the outline of the base of the tooth and the integral reinforcement I—K—I at the throat, providing for the undercutting of the base at the inner end thereof and the inward extension or prolongation of the cutting edges A.

Fig. 7ᵇ shows, in plan, the outline of the upper face of the tooth and the integral reinforcement I—K—I.

Fig. 7ᶜ shows the tooth in cross-section, in a plane perpendicular to the apex G and between the points B and K. From this figure it will be apparent that the portion of the tooth between the sides M and which constitutes, by far, the greater part of the material of the tooth, is of the same thickness as the saw, and, hence, that the tooth, notwithstanding the inward prolongation of the cutting edges and the undercutting of the base at the throat, has its stock greatly augmented, as compared with the stock of an ordinary tooth. It follows that the teeth may be cut substantially finer, without undue sacrifice of strength or reduction of the length of the cutting edges than is possible with the constructions heretofore existing.

The method is applicable to the saws or saw blanks as assembled in gangs on the usual mandrel of the gin or linter. Under the practice heretofore existing, the teeth are first formed by a punching die and the saws are thereafter sharpened by side filers, after which they are assembled as a gang. In the practice of the present method, as applied to saw blanks, the blanks may be first assembled as a gang and thereafter the teeth formed therein.

The method contemplates a cutter of special character to form the teeth by successive operations performed first at one, and then at the opposite, side of the saw. This cutter is preferably of the well known form shown in Fig. 6 and which is known in the mechanical trades as an "angular bevel cutter", but other forms of cutters, adapted to the invention, may be employed, if desired.

The cutter shown which is designed for the formation of teeth of the structure shown in Figs. 7, 7ª, 7ᵇ and 7ᶜ, has a suitable number, e. g. eight, of cutting teeth 10 with substantially radially disposed upper cutting edges 11 terminating at points 12 from which the outer edges of the teeth, common to their upper and lower faces, recede to points inwardly of the imaginary circle wherein the points 12 lie. The upper faces of the teeth are in planes inclined at a slight angle downwardly from the common plane wherein the edges 11 lie and the under faces of the teeth have a regular and uniform bevel, whereby the lower cutting edges 11ª extend at an acute angle inward and downward from the edges 11. The cutter is mounted upon a spindle, and, in use, is rotated at a rapid rate.

The drawings show the cutter as working in relation to three saw blanks of a gang. The operation, however, is the same, whether the cutter work on saw blanks for the purpose of forming new teeth therein, on formed saws of the ordinary types for the purpose of cutting teeth therein of the special character above described, or on formed saws having such teeth for the purpose of renewing or sharpening them.

As above stated, the cutter performs two successive operations on a saw in the formation of a tooth, one operation being at one side of the saw and the other operation being at the other side of the saw. The means whereby the cutter is moved into and from operative relation to the saw and is shifted from one saw to another, form no part of the present invention, and, in the contemplation of the method, may be of any suitable construction. An example of such a means is, however, shown in my co-pending application for Patent Serial No. 161,002 for a machine for forming or renewing and sharpening the teeth of gin and linter saws.

The three saw blanks are similarly designated X, Y and Z in the several figures. Fig. 1 shows the cutter working simultaneously at the right side of the blank X and at the left side of the blank Y. The cutter commences its operation at a point on the periphery of the blank and is fed inward by the means provided therefor through a distance necessary to form the tooth of the length contemplated. In Fig. 1$^a$ the cutter is shown at the limit of its inward movement and the work on one side of the blank X as completed. Fig. 2 shows the cuts made in the blanks X and Y when the cutter works in relation to said blanks, as shown in Figs. 1 and 1$^a$. In both blanks X and Y the cutter has, with its cutting edges 11, formed the base D of the next preceding tooth and has undercut said base at one side thereof, at the right side of the blank X, and at the left side of the blank Y, as best shown in Fig. 1$^b$. In both cases, the cutter has made a substantially V-shaped notch in the blank, as shown in Fig. 1$^a$, and of which the base D forms one wall. The other wall of the notch is formed by the cutting edges 11$^a$ and is inclined laterally, its inclination being downward toward the right in the blank X and downward toward the left in the blank Y. A portion of the surface of the laterally inclined wall of each notch constitutes one of the inclined sides F of the upper face of the tooth.

Fig. 3 shows the cutter as working simultaneously upon the blanks Y and Z, at the right side of the blank Y and the left side of the blank Z. The cutter forms a notch in the blank Z exactly similar to the notch previously formed in the blank Y, as shown in Fig. 2. In its operation on the blank Y in Fig. 3 the cutter completes the tooth except for the formation of the base thereof, that is to say, in working on the right side of the blank Y, the cutter completes the undercutting of the base of the next preceding tooth, as shown in Fig. 3$^a$, and cuts away one side of the transversely inclined wall of the notch whereby the said wall has an inverted V-shaped cross-section and is accordingly formed with the apex G and inclined sides F, as shown in Figs. 4 and 3$^a$.

In Fig. 5 the cutter is shown as working in the same relation as in Fig. 1 upon the blanks X and Y but as forming the teeth next below the teeth formed by the operation depicted in Fig. 1. The action of the cutter in the relation shown in Fig. 5 is exactly the same as in Fig. 1. That is to say, the cutter forms the base of the next preceding tooth and cuts a V-shaped notch of which said base forms one wall. It is to be observed, however, that the plane of the base includes the lower or outer terminal point of the apex G, as shown in the case of the blank Y in Fig. 4, whereby the outer end of the base is triangular and the point of the tooth is of triangular pyramidal form. This is very clearly illustrated in Figs. 5 and 5$^a$ showing a completed tooth T and below it a half finished tooth T'. It will be observed that the base D of the tooth T is cut in a plane in which the lower or outer end of the apex G, as formed prior to the cutting of the tooth next below, lies.

It will be understood that all of the teeth are formed similarly to the tooth T shown in Figs. 5 and 5$^a$, and that the showing of the cutter as working only at the right side of the blank X and at the left side of the blank Z has been adopted merely as a matter of convenience to illustrate the operation of the cutter at relatively opposite sides of the blank. It is, of course, obvious that the teeth of the blank X require for their completion operations of the cutter at the left side of said blank similar to the operation shown in connection with the blank Z, and that the teeth of the blank require for their completion operations of the cutter at the right side of said blank similar to the operations shown in connection with the blank X.

When the cutter working at one side of the blank has formed a notch therein, it is moved beyond the periphery of the blank and the blank is then shifted about its center as an axis of rotation through the distance of a tooth whereby the cutter may repeat the operation in connection with the formation of the next lowermost tooth.

In working on the old teeth of formed saws, the principles of operation are the same. In such cases, if the saws be of the types heretofore existing, the teeth are entirely recut, i. e., the old teeth are cut away and new teeth are formed; and if the saws be provided with teeth of the special character described such teeth are renewed and brought to their original form, and, in the case of linter teeth, to their original degree of sharpness, whereby, in all cases, the teeth are maintained uniform and in the most efficient condition, although the actual cutting involved in such renewal of the teeth may be comparatively slight.

In all cases, the action of the cutter is positive since it is upon the stock of the teeth rather than upon the mere surfaces thereof, as in the case of the filers and gummers of the ordinary sharpening machines, that the cutter works. Hence, the action of the cutter is independent of the condition or alinement of the teeth transversely of the gang and such alinement will be perfectly and uniformly maintained.

Since the teeth are better adapted to effectually resist the great wear and tear to which they are subject, and since by the method described, the teeth are maintained uniform and in the most efficient condition, and, moreover, since the cutter, as used in accordance with the method, accomplishes the purpose of both the gummers and the filers of the ordinary machines, it follows that the time required for the renewal of the teeth will be much shorter than under existing conditions. Thus, with a multiple-head machine for practising the present method, the work of renewing the teeth of a normal linter gang containing one hundred and six saws may be performed, at the most, within half an hour, whereas, the gummers and filers heretofore employed have required from four to five hours for the completion of their work. Owing to the great length of time required for renewing teeth by the gumming and filing machines, it is frequently the case that the teeth will not be renewed as often as is necessary for the efficient operation of the saws. But where the amount of time required for the renewal of the teeth is reduced from several hours to a period not longer than half an hour, a daily renewal of the teeth may be resorted to without any liability of causing congestion in the work of the plant.

In the following claims the word "saw" is to be understood as a convenient designation generically applying both to saw blanks and formed saws.

I claim—

1. A method of forming or renewing and sharpening the teeth of linter saws which consists in operating upon the saw at one side thereof to cut a notch therein between its side faces, said notch having an upper wall with a transversely straight face providing a tooth base and a lower wall with a laterally inclined face extending at an angle from said transversely straight face, and thereupon in operating in like manner upon the saw at the opposite side thereof and in the same notch to cut said lower wall whereby its face has a central apex and sides inclined divergingly from said apex.

2. A method of forming or renewing and sharpening the teeth of linter saws which consists in operating upon the saw at one side thereof to cut a notch therein between its side faces, said notch having an upper wall with a transversely straight face laterally undercut at its inner end and providing a tooth base and a lower wall with a laterally inclined face extending at an angle from said transversely straight face, and thereupon in operating in like manner upon the saw at the opposite side thereof and in the same notch to cut said lower wall whereby its face has a central apex and sides inclined divergingly from said apex and to laterally undercut said base in an opposite direction and from the center of the undercut imparted thereto in the first operation.

3. A method of forming or renewing and sharpening teeth of linter saws which consists in operating upon the saw with a rotatable angular bevel cutter at one side thereof to cut a notch therein between its side faces, said notch having an upper wall with a transversely straight face providing a tooth base and a lower wall with a laterally inclined face extending at an angle from said transversely straight face and thereupon in operating in like manner upon the saw at the opposite side thereof and in the same notch to cut said lower wall whereby its face has a central apex and sides inclined divergingly from said apex.

4. A method of forming or renewing the teeth of gin or linter saws which consists in operating upon the saw at one side thereof to cut a notch therein between its side faces, said notch having an upper wall with a face providing a tooth base and a lower wall whose face extends at an angle from the tooth-base face of said upper wall and is transversely inclined, and thereupon in operating in like manner upon the saw at the opposite side thereof and in the same notch to cut said lower wall whereby its face has a central apex and sides inclined divergingly from said apex.

5. A method of forming or renewing the teeth of gin or linter saws which consists in operating upon the saw at one side thereof to cut a notch therein between its side faces, said notch having an upper wall with a face laterally undercut at its inner end and providing a tooth base and a lower wall whose face extends at an angle from the tooth-base face of said upper wall and is transversely inclined, and thereupon in operating in like manner upon the saw at the opposite side thereof and in the same notch to cut said lower wall whereby its face has a central apex and sides inclined divergingly from said apex and to laterally undercut said base in an opposite direction and from the center of the undercut imparted thereto in the first operation.

6. A method of forming or renewing the teeth of gin or linter saws which consists in operating upon the saw with a rotatable angular bevel cutter at one side thereof to cut a notch therein between its side faces, said notch having an upper wall with a face providing a tooth base and a lower wall whose face extends at an angle from the tooth-base face of the upper wall and is transversely inclined, and thereupon in operating in like manner upon the saw at the opposite side thereof and in the same notch to cut said lower wall whereby its face has a central apex and sides inclined divergingly from said apex.

In testimony whereof I have hereunto set my hand in presence of two subscribing witnesses.

ROBERT H. BUTTERS.

Witnesses:
CLIFF C. HATCHER,
G. A. NICOLSON, Jr.

Copies of this patent may be obtained for five cents each, by addressing the "Commissioner of Patents, Washington, D. C."